United States Patent
Lee et al.

(10) Patent No.: US 7,986,609 B2
(45) Date of Patent: Jul. 26, 2011

(54) OPTICAL RECORDING MEDIUM

(75) Inventors: Seung Yoon Lee, Seoul (KR); Hun Seo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 680 days.

(21) Appl. No.: 11/915,560

(22) PCT Filed: May 29, 2006

(86) PCT No.: PCT/KR2006/002049
§ 371 (c)(1),
(2), (4) Date: Nov. 26, 2007

(87) PCT Pub. No.: WO2006/126867
PCT Pub. Date: Nov. 30, 2006

(65) Prior Publication Data
US 2008/0198739 A1    Aug. 21, 2008

(30) Foreign Application Priority Data
May 27, 2005   (KR) .................. 10-2005-0044998

(51) Int. Cl.
*G11B 7/00*   (2006.01)
(52) U.S. Cl. ................................ 369/275.1
(58) Field of Classification Search ............ 369/275.3, 369/94, 47.53, 44.26, 275.4, 275.2, 275.1
See application file for complete search history.

(56) References Cited

U.S. PATENT DOCUMENTS

| | | | |
|---|---|---|---|
| 5,981,014 A | 11/1999 | Tsukagoshi et al. | |
| 6,751,184 B2 * | 6/2004 | Kojima et al. | 369/275.2 |
| 7,260,053 B2 * | 8/2007 | Harigaya et al. | 369/288 |
| 7,304,930 B2 * | 12/2007 | Kitaura et al. | 369/59.11 |
| 7,436,743 B2 * | 10/2008 | Kubo et al. | 369/47.53 |
| 7,704,582 B2 * | 4/2010 | Lee | 428/64.5 |

FOREIGN PATENT DOCUMENTS

| | | |
|---|---|---|
| CN | 1472736 A | 2/2004 |
| EP | 1378896 A2 | 1/2004 |
| EP | 1439532 A2 | 7/2004 |
| JP | 8-106647 A | 4/1996 |
| JP | 10-329426 A | 12/1998 |
| JP | 2001-10232 A | 1/2001 |
| JP | 2004-013942 A | 1/2004 |
| JP | 2004-39147 A | 2/2004 |
| JP | 2004-47046 A | 2/2004 |
| JP | 2004-55117 A | 2/2004 |
| JP | 2005-032359 A | 2/2005 |
| WO | WO-99/06220 A1 | 2/1999 |

* cited by examiner

*Primary Examiner* — Nabil Z Hindi

(74) *Attorney, Agent, or Firm* — Birch, Stewart, Kolasch & Birch, LLP

(57) ABSTRACT

An optical recording medium records information in a mechanism of generating new material, having reflectance different from that of others in information recording layer, when laser beam is projected thereto. The optical recording medium includes a substrate, and a reflective layer positioned on the substrate to reflect an entering laser beam and having an information recording layer. The information recording layer includes a first information recording layer containing one or more elements selected from a group of Si, Ge, and Sb, and a second information recording layer containing one or more elements selected from a group of Si, Sb, Te, and Al. Data can be recorded in high density and the optical recording medium provides high recording stability and recording sensitivity.

24 Claims, 12 Drawing Sheets

Total thickness vs. thickness ratio

Thickness ratio(Si/Ag alloy)

OPTICAL RECORDING MEDIUM

TECHNICAL FIELD

The present invention relates to an optical recording medium, and more particularly, to an optical recording medium having a high recording stability and a data recording density.

BACKGROUND ART

A multimedia age when video signals containing a motion picture and a still image, audio signal, and computer data are integrally processed has come, and simultaneously package media such as a compact disc (CD), a digital versatile disc (DVD), and the like are popularized far and wide. Recently, attempts are vigorously carried out to apply an optical recording medium to a recording medium of a mobile phone, a digital camera, broadcasting, movie, or the like. In new generation media, this trend would be stronger.

The optical recording medium is grouped into a read-only-memory (ROM) type optical recording medium, a recordable type optical recording medium to record information only once, and a rewritable type optical recording medium to write and erase information repeatedly.

Among the optical recording media, the read-only-memory type optical recording medium has pit-shaped minute recesses that are formed in the circumferential direction and a reflective layer formed in the optical recording medium. The recordable type optical medium that would be used for the collection of backup data, broadcasting, movies, and the like has an information recording layer which may be made of organic material or inorganic material such as dye. However, when the organic material is used in forming the information recording layer, data recorded in the optical medium may not last for a long time.

In the recordable type optical recording medium, information is recorded in such way that a) the recording material is burned to generate the pits, b) volume of the recording material expands to generate the pits during the decomposition, or c) the information recording layer is melted and becomes solid again to generate new phase. To be the new generation recording medium, a very high recording density and very fast data transfer rate are required. In order to increase the recording density of information in the optical recording medium, the size of recording marks of the optical recording medium must be smaller than the of the present recording marks. Thus, wavelength of laser projected onto the optical recoding medium must be shorter than 450 nm and the numerical aperture must be also equal to or greater than 0.7. Moreover, the data transfer rate must be much faster than the present data transfer rate of 30 Mbps to 35 Mbps.

In a blue-ray disc (BD) as one of the new generation recording medium, the optical recording medium must contain a recording material in which jitter is allowed within ranges of a wavelength of 405 nm, and a recording constant linear velocity of 5.28 m/s to 10.56 m/s. Particularly, in the recordable type optical recording medium, 1) contrast between a recording mark and a space in the optical recording medium must be high, 2) the recording sensitivity is high, 3) the recorded mark must be stable (mark stability), and 4) recording characteristics including recording mark noise and the jitter must be satisfied in the BD system.

Moreover, when the laser is projected onto the optical recording medium and the recording mark is generated in the optical recording medium, laser power must not be too much higher than that which is required for the generation of the recording mark.

DISCLOSURE OF INVENTION

Accordingly, present invention is directed to an optical recording medium that substantially obviates one or more problems due to limitations and disadvantages of the related art.

An object of the present invention is to provide an optical recording medium to solve the above-mentioned disadvantages of the conventional optical recording medium. Another object of the present invention is to provide an optical recording medium in which a recording mark is generated having a high contrast between the recording mark and a space and a high recording sensitivity.

Still another object of the present invention is to provide an optical recording medium having excellent recording characteristics such as recording mark stability and jitter.

A further object of the present invention is to provide an optical recording medium having the above-mentioned recording characteristics and a not-too-high laser power necessary to generate a recording mark.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical recording medium including a substrate, and a reflective layer positioned on the substrate to reflect an entering laser beam and having an information recording layer. The information recording layer includes a first information recording layer containing one or more elements selected from a group of Si, Ce, and Sb, and a second information recording layer containing one or more elements selected from a group of Si, Sb, Te, and Al.

Preferably, the information recording layer comprises one or more first information recording layers and one or more second information recording layers, and the first information recording layers and the second information recording layers are alternately laminated such that the number of contacting surfaces between the first information recording layers and the second information recording layers is equal to or greater than two. When there are two or more contact surfaces, since reactive area between recording material of the two information recording layers is increased, the recording mark is easily generated in the thickness direction of the optical recording medium.

In order to maintain a predetermined reflectance of the recording marks generated in the information recording layers, the a thickness of the information recording layer is equal to or greater than 90 Å and less than 200 Å. Moreover, the information recording layer further comprises a recording sensitivity acceleration layer containing one or more elements selected from a group of Sn, Yn, Pb, Bi, Ti, Te, Se, S, Al, Ga, Ge, Cd, I, and In. The recording sensitivity acceleration layer is laminated to contact any one of surfaces of the first information recording layer through which the laser beam firstly enters and the surface thereof near the substrate. Preferably, the recording sensitivity acceleration layer is laminated to contact any one of surfaces of the second information recording layer through which the laser beam firstly enters and the surface thereof near the substrate. Since the materials contained in the recording sensitivity accelerating layer have low melting points, the materials react before the other materials contained in the respective information recording layers when the laser beam is projected thereonto. At this time, since latent heat caused by the reactions supplies heat required in the reactions in the information recording layers, the laser power required to generate the recording mark can be reduced.

The optical recording medium further includes a dielectric layer laminated to contact at least one of surfaces of the first information recording layer through which the laser beam firstly enters and the surface thereof near the substrate. The dielectric layer prevents the substrate or a plastic cover sheet from damage due to increased temperature in the information recording layers according to the position thereof, or emits heat generated in the information recording layer at a proper rate to properly adjust thermal equilibrium of the information recording layers.

The first information recording layer includes one element of 50 or more atomic percentage selected from a group of Si, Ge, and Sb. The recording mechanism, when the recording mark is generated in the optical recording medium, is more definite when a single element selected from a group of Si, Ge, and Sb is used in the first information recording layer and in this case the recording mark is easily generated in the optical recording medium. To achieve another object of the present invention, an optical recording medium includes a substrate, a reflective layer positioned on the substrate to reflect an entering laser beam, two or more information recording layers positioned on the reflective layer, and a separation layer laminated between the respective information recording layers adjacent to each other. The respective information recording layers include a first information recording layer containing one or more elements selected from a group of Si, Ge, and Sb, and a second information recording layer containing one or more elements selected from a group of Si, Sb, Te, and Al.

The number of the information recording layers in the optical recording medium of the present invention may be two or more, and preferably, two or more information recording layers adjacent to each other are separated from each other by a separation layer. When the number of the information recording layers is two or more, the optical recording medium has a data storage capacity greater than that of an optical recording medium having a single information recording layer. Moreover, when the optical recording medium has two or more information recording layers, the respective information recording layers may have the same structure as the structure of a single information recording layer of an optical recording medium having a single information layer. The optical recording medium having two or more information recording layers may further include a recording sensitivity acceleration layer or a dielectric layer like the optical recording medium having a single information recording layer. When the laser beam is projected onto the optical recording medium of the present invention, the laser beam must permeate a first information recording layer and must generate the recording mark in a second information recording layer. Thus, thickness of the first information recording layer is preferably different from thickness of the second information recording layer in view of transmittance.

A ratio between the thickness of the first information recording layer and the thickness of the second information recording layer, contained in the two or more information recording layers, is different from a ratio between the thickness of the first information recording layer and the thickness of the second information recording layer, which are contained in any one of other information recording layers except for the two or more information recording layers. Sum of thicknesses of the first information recording layer and the second information recording layer, contained in any one of the two or more information recording layers, is different from sum of thicknesses of the first information recording layer and the second information recording layer contained in any one of other information recording layers except for the information recording layer.

To achieve still another object of the present invention an optical recording medium includes at least one information recording layer, wherein each of the information recording layers includes a first information recording layer and a second information recording layer, wherein the first information recording layer and the second information recording layer are reacted by a laser beam to generate a mark having a reflectance different from those of the first information recording layer and the second information recording layer. The first information recording layer includes one or more elements selected from a group of Si, Ge, and Sb, and the second information recording layer includes one or more elements selected from a group of Si, Sb, Te, and Al. The first information recording layer includes one element of 50 or more atomic percentage selected from a group of Si, Ge, and Sb.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of an optical recording medium of the present invention, examples of which are illustrated in the accompanying drawings.

Figure 1:
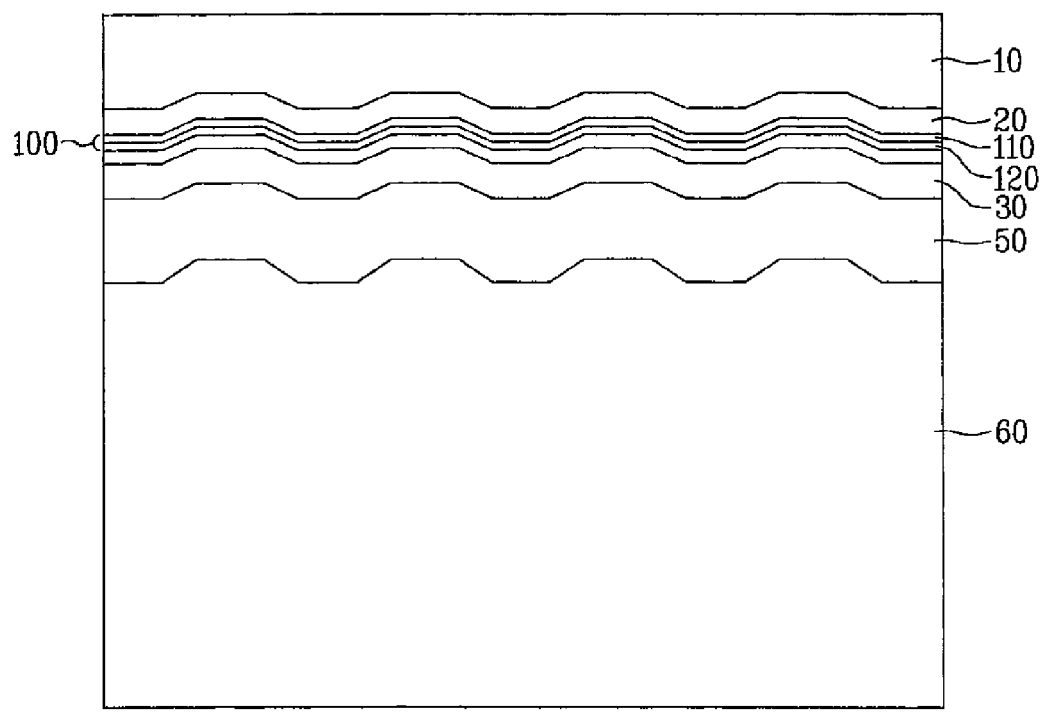
FIG. 1 is a view illustrating the structure of an optical recording medium according to a preferred embodiment of the present invention.

Referring to FIG. 1, a structure of an optical recording medium according to a preferred embodiment of the present invention will be described as follows. The optical recording medium according to the preferred embodiment of the present invention includes a substrate 60, a reflective layer 50, and an information recording layer 100. Moreover, the optical recording medium preferably further includes an optical transmission layer 10 and dielectric layers 20 and 30. The information recording layer includes a first information recording layer 110 and a second information recording layer 120.

The substrate 60 supports a physical shape of the optical recording medium according to the preferred embodiment of the present invention. As the substrate 60, ceramic, glass, or resin is usually used, and preferably polycarbonate resin is used as a material of the substrate 60. The reflective layer 50 positioned on the substrate 60, reflects a laser beam entering through the optical transmission layer to emit the reflected laser beam toward the optical transmission layer 10. Thus, the reflective layer is preferably made of a material having a high reflectance or an alloy added with a material having a high reflectance.

The information recording layer 100 is positioned on the reflective layer 50 and may include two or more information recording layers 110 and 120. For illustrative convenience, the information recording layers contained in the information recording layer 100 are respectively referred to as a first information recording layer 110 and a second information recording layer 120. Materials contained in the first information recording layer 110 and the second information recording layer 120 are mixed with each other to generate new material when the laser beam is projected thereonto, and the new generated material has a reflectance very different from those of materials around the same. The first information recording layer 110 and the second information recording layer 120, which are positioned in the information recording layer 100 as shown in FIG. 1, may be changed to each other in position, but the first information recording layer 110 is not limited to being positioned at a side through which the laser beam firstly enters. The first information recording layer 110 preferably contains one or more elements selected from a group of Si, Ge, and Sb. Moreover, the first information recording layer 110 preferably contains an element selected from the group of Si, Ge, and Sb as a main element of 50 atomic % or more. The second information recording layer 120 contains Ag, and preferably a material containing one or more elements selected from a group of Si, Sb, Te, and Al. When the laser beam is projected, the material of the first information recording layer 110 and the material of the second information recording layer 120 react with each other at a contacting surface between the first information recording layer 110 and the second information recording layer 120 to generate a recording mark through a mechanism of generating a new material. The materials contained in the respective information recording layers 110 and 120 easily generate the recording mark and record and reproduce data under the conditions satisfying the blue-ray disc specification.

Moreover, the optical recording medium according to the preferred embodiment of the present invention preferably includes dielectric layers laminated on one or more layer-contacting sides of the information recording layer 100. The dielectric layers are preferably made of $ZnS-SiO_2$. When the dielectric layer 20 (hereinafter referred to as a lower dielectric layer) is laminated on a side of the layer-contacting sides of the information recording layer 100 to which the laser beam is firstly projected, the lower dielectric layer 20 adjusts the reflectance and contrast of the optical recording medium according to the preferred embodiment of the present invention. Moreover, the lower dielectric layer 20 prevents the substrate 60 or the optical transmission layer 10 from damage due to temperature rise of the information recording layer. The lower dielectric layer 20 may be laminated to perform the above-mentioned performance sufficiently, and preferably thickness of the lower dielectric layer 20 exceeds 0 nm and is less than 80 nm.

Figure 2:
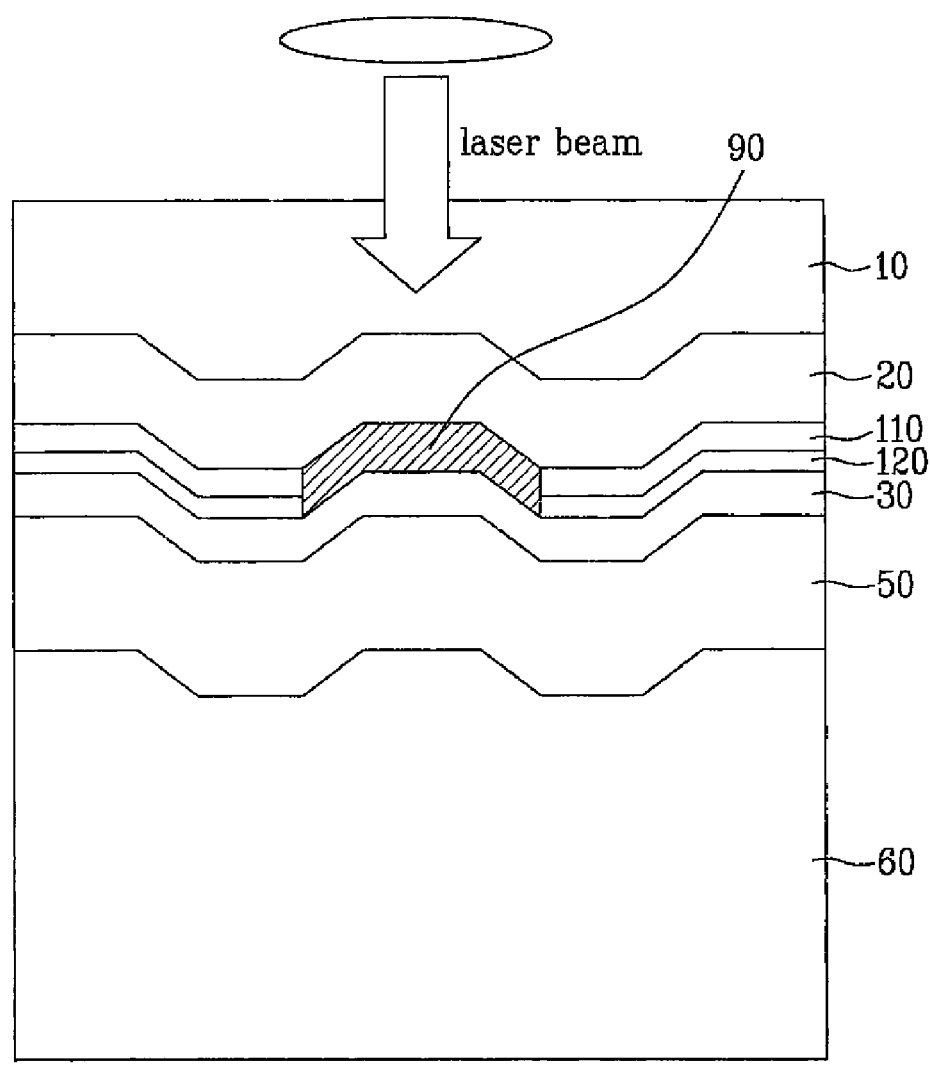
FIG. 2 is a schematic view illustrating an example of a recording mark generated when land recording is performed in the optical recording medium according to the preferred embodiment of the present invention.
Figure 3:
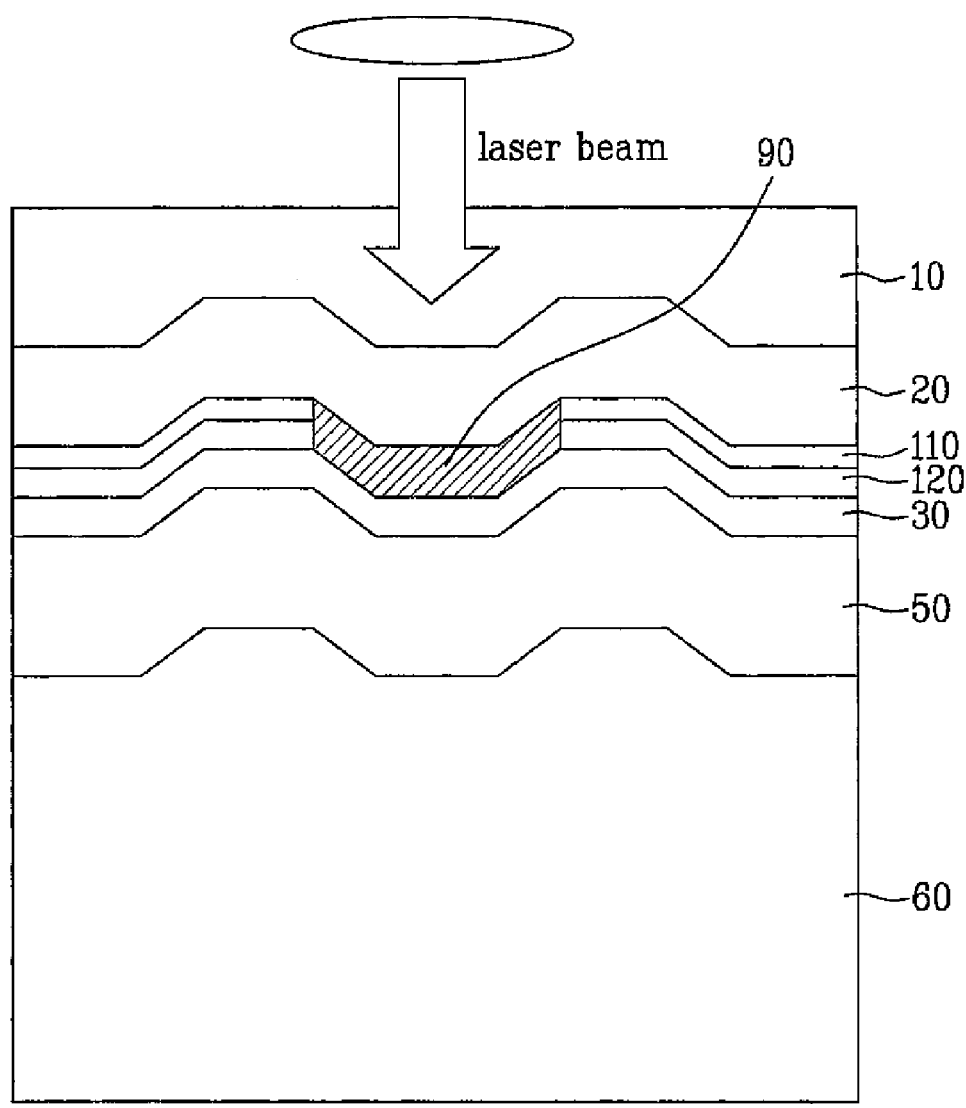
FIG. 3 is a schematic view illustrating an example of a recording mark generated when groove recording is performed in the optical recording medium according to the preferred embodiment of the present invention.

When the dielectric layer 30 (hereinafter referred to as an upper dielectric layer) is laminated on a side of the layer-contacting sides of the information recording layer 100, near the substrate, the upper dielectric layer 30 emits heat generated in the information recording layer when the laser beam is projected onto the information recording layer at a proper rate so that the temperature distribution of the information recording layer is properly adjusted. The upper dielectric layer 30 may be laminated to perform the above-mentioned performance sufficiently, and preferably thickness of the upper dielectric layer 30 exceeds 0 nm and is less than 50 nm. Referring to FIGS. 2 and 3, recording method in which data is recorded in the optical recording medium according to the preferred embodiment of the present invention by projecting the laser beam onto the optical recording medium will be described as follows. The information recording layer of the optical recording medium according to the preferred embodiment of the present invention has grooves and lands formed in the surface thereof. The grooves mean tracks protruded in the advancing direction of the laser beam and the lands mean depressed tracks.

As shown in FIG. 2, groove recording means that data is recorded in convex portions of the information recording layers 110 and 120, and in other words, means that a recording mark 90 is generated at a side of the surfaces of the information recording layers 110 and 120 to which the laser beam firstly contacts. This is referred to as "On groove recording" in blue-ray disc standards.

As shown in FIG. 3, the land recording means that data is recorded in concave portions of the information recording layers 110 and 120, and in other words, means that the recording mark 90 is generated at a side of the surfaces of the information recording layers 110 and 120 to which the laser beam secondly contacts. This is referred to as "In groove recording" in blue-ray disc standards.

Figure 4:
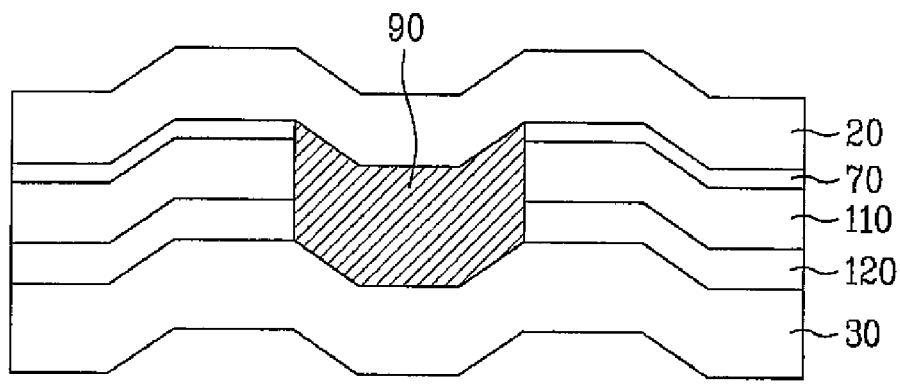
FIG. 4 is a schematic view illustrating an example of a recording mark generated when a recording sensitivity acceleration layer is contained in the optical recording medium according to the preferred embodiment of the present invention.

Referring to FIG. 4, the structure of the optical recording medium according to the preferred embodiment of the present invention will be described as follows. The structure of the optical recording medium according to this preferred embodiment of the present invention is identical to the structure depicted in FIG. 1, but a recording sensitivity acceleration layer 70 may be laminated around or in the information recording layers 110 and 120. The recording sensitivity acceleration layer 70 is preferably laminated with a material into which one or more elements selected from a group of Sn, Zn, Pb, Bi, Ti, Te, Se, S, Al, Ga, Ge, Cd, I, and In are added. The material suitable to be added in the recording sensitivity acceleration layer 70 has a low melting point so that the material reacts before the materials of the information recording layers 110 and 120 when the laser beam is projected thereonto, and latent heat generated due to the phase change during the reaction can partially supply heat necessary for the reaction of the contacting information recording layer 110 or 120. Thus, when the recording sensitivity acceleration layer is laminated in the optical recording medium according to the preferred embodiment of the present invention, the laser power necessary for generating the recording mark 90 can be reduced. Thus, the recording sensitivity acceleration layer 70 can be positioned at the side of the information recording layers 110 and 120 through which the laser beam firstly enters, at a side near the substrate, or between the first information recording layer 110 and the second information recording layer 120. However, as shown in FIG. 4, most preferably, the recording sensitivity acceleration layer 70 is laminated to contact the side of the information recording layer 100 through which the laser beam firstly enters.

Figure 5:
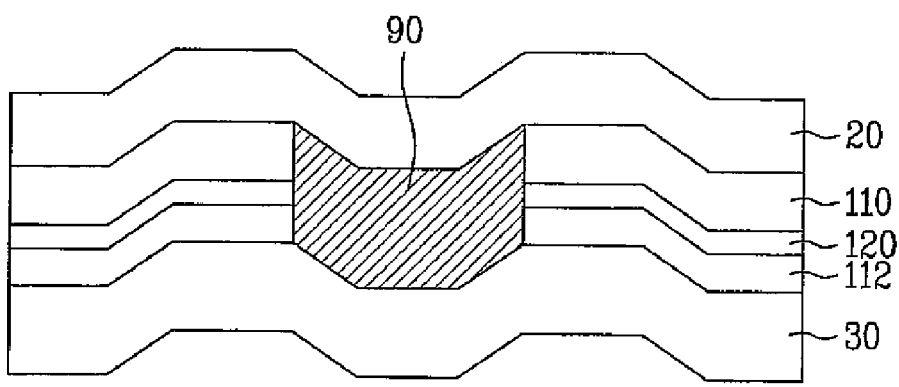
FIG. 5 is a schematic view illustrating an example of a recording mark generated when the information recording layer of the optical recording medium according to the preferred embodiment of the present invention includes a first information recording layer and a second information recording layer alternately laminated to be adjacent to each other.

Referring to FIG. 5, an optical recording medium according to another preferred embodiment of the present invention will be described as follows. The structure of the optical recording medium depicted in FIG. 5 includes one or more first information recording layers 110 and 112 and one or more second information recording layers 120, which are formed in the information recording layer 100. The first information recording layers 110 and 112 and the second information recording layer 120 are alternately laminated such that the number of contacting surfaces between the first information recording layers 110 and 112 and the second information recording layer 120 may be two or more. When the information recording layers are laminated as described above, the reaction areas between the first information recording layers 110 and 112 and the second information recording layer 120 are increased so that the recording mark 90 is easily generated in the thickness direction of the optical recording medium. FIG. 5 is a view illustrating the structure of the optical recording medium according to another preferred embodiment of the present invention. In this structure, the two first information recording layers 110 and 112 are laminated on the contacting surfaces of the second information recording layer 120.

Figure 6:
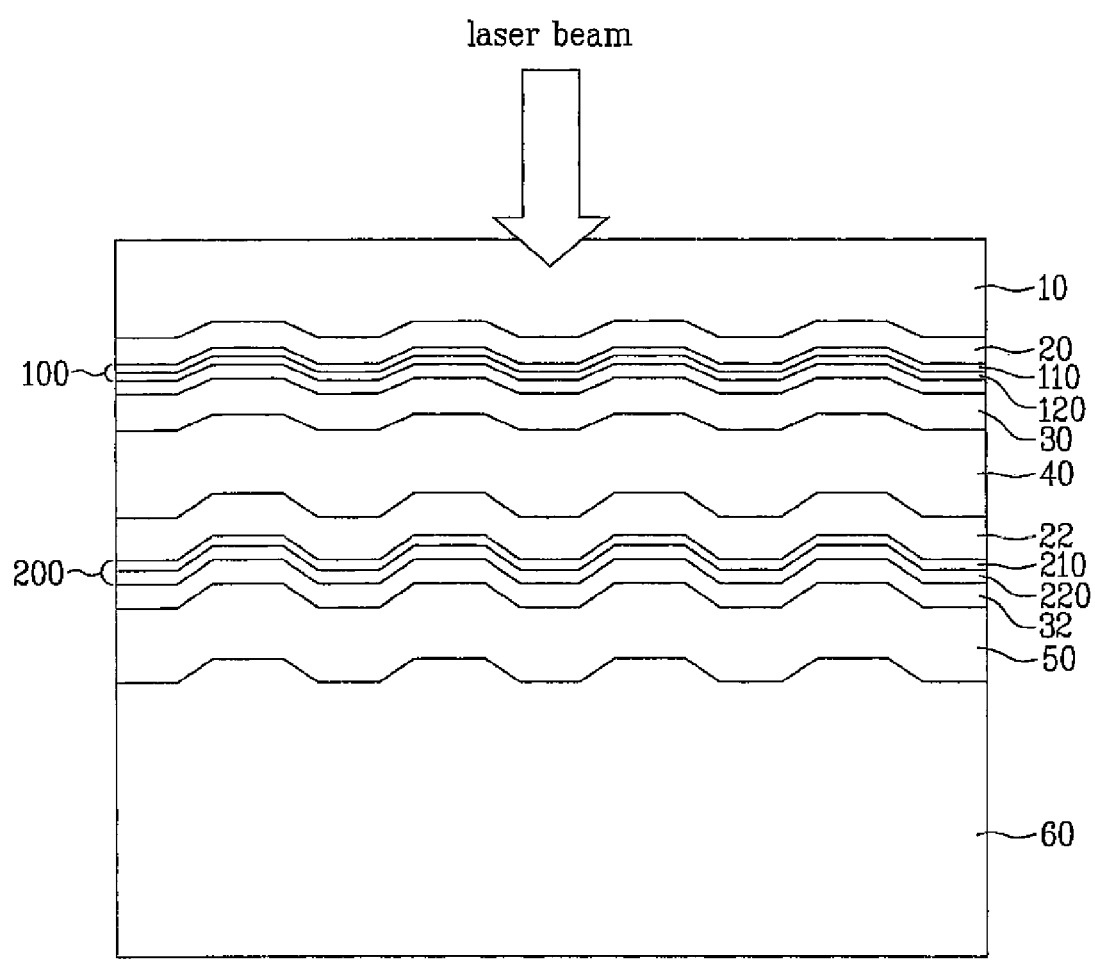
FIG. 6 is a view illustrating the structure of an optical recording medium according to another preferred embodiment of the present invention.

Referring to FIG. 6, an optical recording medium according to still another preferred embodiment of the present invention will be described as follows. The optical recording medium according to still another preferred embodiment of the present invention may include a substrate 60, a reflective layer 50, two or more information recording layers 100 and 200, separation layers 40 positioned between the respective information recording layers, lower dielectric layers 20 and 22 and upper dielectric layers 30 and 32, which are laminated to be adjacent to the respective information recording layers 100 and 200. The information recording layers 100 and 200 may include the recording mark 90 formed in the form of the structure and shape as shown in FIGS. 2 to 5. The lower dielectric layers 20 and 22 and the upper dielectric layers 30 and 32, like the description in relation with FIG. 1, may be selectively laminated on the side through which the laser beam firstly enters or on the side near the substrate.

The two or more information recording layers 100 and 200 are allowed to have different structures, respectively. Thus, any one of the two or more information recording layers 100 and 200 includes one more first information recording layer and one more second information recording layer and the first information recording layer and the second information recording layer are alternately laminated so that the number of the contacting surfaces between the first information recording layer and the second information recording layer may be two or more. Moreover, the recording sensitivity acceleration layer is possibly laminated on any one of the information recording layers.

When two or more information recording layers 100 and 200 are laminated, sum of thicknesses of the first information recording layer and the second information recording layer contained in any one of the information recording layers 100 and 200 may be different from sum of thicknesses of the first information recording layer and the second information recording layer, which are contained in any one of other information recording layers except for the information recording layer. Further, a ratio between the thicknesses of the first information recording layer and the second information recording layer is preferably different from a ratio between the thickness of the first information recording layer and the thickness of the second information recording layer, which are contained in any one of the information recording layers except for the information recording layer. In other words, the respective thicknesses of the two information recording layers 100 and 200 are different from each other when taking the transmittance into consideration. The reason is because, in a case of forming two more information recording layers 100 and 200 in the optical recording medium, after the recording mark is generated in the information recording layer 100 through which the laser beam firstly enters, the laser power is maintained within a standard range in the information recording layer 200 through which the laser beam enters later such that the recording mark is generated in the information recording layer 200. For example, if the thickness of the information recording layer through which the laser beam firstly enters is a thickness corresponding to transmittance of 40% to 60%, the thickness of the information recording layer 200 through which the laser beam enters later can be a thickness having transmittance less than 1%.

Experimental results with respect to the optical recording medium according to the preferred embodiment of the present invention will be described. Firstly, the structure and recording material of the optical recording medium used in the experiments are as follows.

The optical recording medium used in the experiments includes a donut-shaped substrate having an inner diameter of 15 mm, an outer diameter of 120 mm, and a thickness of 1.1 mm and the substrate that has tracks having lands and grooves and formed at track pitches of 0.32 μm. The substrate of the optical recording medium is made of polycarbonate. On the substrate, a reflective layer made of a silver alloy (Ag alloy), an upper dielectric layer made of ZnS—$SiO_2$, a second information recording layer, a first information recording layer, and a lower dielectric layer made of ZnS—$SiO_2$ are sequentially laminated to form a multi-layer thin film structure. Further, as an optical transmission layer, a polycarbonate cover sheet of 80 μm to which PSA adhesive of 20 μm thickness is bonded is formed on the lower dielectric layer. When the upper dielectric layer, the second information recording layer, the first information recording layer, and the lower dielectric layer are laminated on the polycarbonate substrate of the optical recording medium, the thickness of the upper dielectric layer is 60 nm, the thickness of the second information recording layer is 6 nm, the thickness of the first information recording layer is 6 nm, and the thickness of the lower dielectric layer is 60 nm. Conditions for carrying out the experiments with respect to the optical recording medium according to the preferred embodiment of the present invention are as follows. In the above experiments, a constant linear velocity of the optical recording medium is 5.28 m/s and a measuring position in the optical recording medium is a place located 30 mm from the inner circumference of the optical recording medium. Data recording on the optical recording medium is carried out by groove recording, a wavelength of the laser beam used in the experiments is 408 nm, and readout power of the laser beam is set to 35 mW.

Referring to Table 1, the combination of materials of the respective information recording layers of the optical recording medium and the experimental results are as follows.

Si and Ag, Ge and Ag, and Sb and Ag are respective main elements of the first and second information recording layers in a first experiment, of the first and second information recording layers in a second experiment, and of the first and second information recording layers in a third experiment. The combinations of the main elements in every experiment have been estimated in terms of the difference of the optical recording medium with respect to 8T modulation, a magnitude of DC annealing power, a saturated power range, and a mark stability. The combinations exhibiting good results among all results in view of the estimation reference are marked in the right-side columns of the respective estimation columns by circles (the mark stabilities are marked in the mark stability column).

The difference of the reflectance of the optical recording medium with respect to 8T modulation represents the optical contrast between a space and a mark required in the optical recording medium. In other words, the optical contrast of the optical recording medium with respect to 8T modulation is a value of dividing an optical contrast, which is obtained by subtracting a minimum reflectance from a maximum reflectance with respect to the 8T modulation pulses of the laser beam, by the maximum reflectance and is expressed by percentage %. The optical contrast with respect to the 8T modulation pulses of the laser beam is of high priority with respect to estimation reference in the optical recording medium. The optical recording medium having a high reflectance difference is what is desired. In the experiments with respect to the optical recording medium according to the preferred embodiment of the present invention, the Si—Ag combination (Experiment No. 1) of the information recording layers has exhibited the best optical contrast between the space and the mark, that is, 43.5%, and the Sb—Ag combination (Experiment No. 3) of the information recording layers exhibited only a slight variation in optical contrast.

The DC annealing power is a reference for indirectly determining whether or not the optical recording medium having an optimal structure can be recorded by a standard recording power. In the next generation optical recording medium blueray disc, the recording mark must be generated within a recording power of 3 mW to 6 mW with respect to a speed 1× of the optical recording medium and a recording power of 3 mW to 7 mW with respect to a speed 2× of the optical recording medium. In order to indirectly confirm this, a recording power capable of making the changes in the first information recording layer and the second information recording layer is measured, and it is estimated as a proper recording sensitivity with respect to a standard laser power in the optical recording medium when the measured recording power is within 3 mW. As the estimation reference, the experiments for the DC annealing power will be described in detail as follows. Firstly, a laser beam with a space power Ps (mW) is projected onto the optical recording medium. Pulses of the laser beam are not multi-pulse type but a single pulse type. When the laser beam is projected, a laser power, when

TABLE 1

| Nos. of experiments | $1^{st}$ information recording layer | $2^{nd}$ information recording layer | 8T modulation ($I8_{PP}$/$I8_H$) (%) | Estimation | DC annealing power (mW) | Estimation | Saturated power range (ΔmW) | Estimation | Mark stability |
|---|---|---|---|---|---|---|---|---|---|
| 1 | Si | Ag | 43.5 | ○ | 2.7 | Δ | 2.5 | Δ | ○ |
| 2 | Ge | Ag | 38.0 | Δ | 1.5 | ⊙ | 4.5 | Δ | ○ |
| 3 | Sb | Ag | 40→30 | Δ | 2.1 | ○ | 1.2 | ○ | Δ | an initial magnitude of the optical contrast of the optical recording medium starts to change, is measured on an oscilloscope. The measured magnitude of the laser power is a value of the DC annealing power. In the above experiment, when the DC annealing power is less than 2.5 mW, the optical recording medium is estimated as an optimized optical recording medium. In the above experiment, the value of the DC annealing power is the best in the combination of Ge—Ag as the main elements of the first information recording layer-the second information recording layer (Experiment No. 2), the second best in the Sb—Ag combination of the information recording layers (Experiment No. 3), and the worst in the Si—Ag combination of the information recording layers (Experiment No. 1).

The saturated power range is an estimation reference for indirectly confirming a temperature range from when the reaction in the information recording layers starts, to when the reaction is gradually increased in the thickness direction of the optical recording medium and finally the reaction has occurred throughout the whole thickness of the information recording layers. When the value of the saturated power range is high, the range of the laser power where the optimized recording characteristics can be obtained, although temperature where actual reaction begins is lower, can deviate from a specification. Moreover, since the reflectance of the optical recording medium is remarkably changed in an intermediate temperature range, it is difficult to control the recording. In other words, when the recording is carried out in the optical recording medium, the reflectance of the optical recording medium with respect to the laser power must be suddenly changed within a narrow laser power variation. Thus, in order to select a material in which the temperature change in the information recording layer is finished within the narrow temperature range, the best suitable material of the information recording layer is estimated by a material in which the saturated power range is less than 2 mW. In view of the estimation reference, the materials of the first information recording layer-the second information recording layer are estimated to be the best by the Sb—Ag combination (Experiment No. 3) as the main elements of the first information recording layer-the second information recording layer, the second best by the Si—Ag combination (Experiment No. 1), and the worst by the Ge—Ag combination (Experiment No. 1).

The mark stability as an estimation reference in the above experiments is an item for determining whether or not the recording mark can last for a long time without change with respect to time. A magnitude of the recording mark when the recording mark is generated by a laser pulse of 8T modulation must be maintained without being increased or decreased with respect to time under the effect from the laser beam or room temperature. In the experiments with respect to the optical recording medium according to the preferred embodiment of the present invention, it has been found that the recording mark, that is recorded in the material of the information recording layer of the Sb—Ag combination (Experiment No. 3) as the main elements of the first information recording layer-the second information recording layer, is slightly changed. Thus, it is determined that the material of the information recording layer is needed to be improved by changing ratio of the recording material of the optical recording medium or the structure of the optical recording medium.

According to experimental result of the above three experiments, the Si—Ag combination can be estimated as the best suitable for the optical recording medium from all the experiments. However, since the magnitude of the DC annealing power with respect to the Si—Ag combination is slightly large, the Si—Ag combination can be a more suitable recording material if the recording laser power can be further reduced.

In order to increase the reflectance and the recording sensitivity, a simulation is carried out with respect to the optical recording medium having the Si—Ag combination selected as the best suitable material through the experiments as the main elements of the first information recording layer-the second information recording layer. In the simulation, the reflectance and the DC annealing power are measured at the laser reproducing power of 0.35 mW while changing a ratio of the thicknesses of the first information recording layer and the second information recording layer and the thickness change of the dielectric layers.

Figure 7:
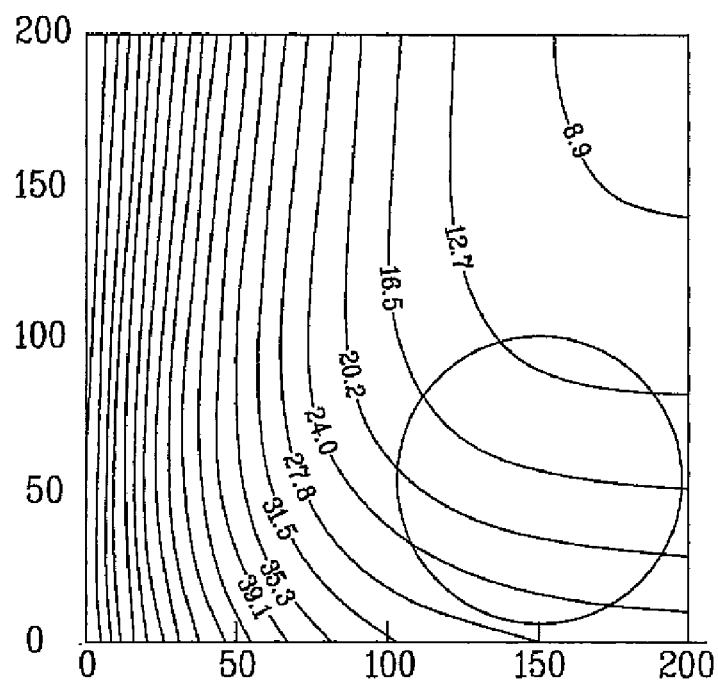
FIG. 7 is a view illustrating reflectance according to the combination of thicknesses of the first information recording layer having a primary element of Si and the second information recording layer made of Ag alloy, obtained from a simulation.
Figure 8:
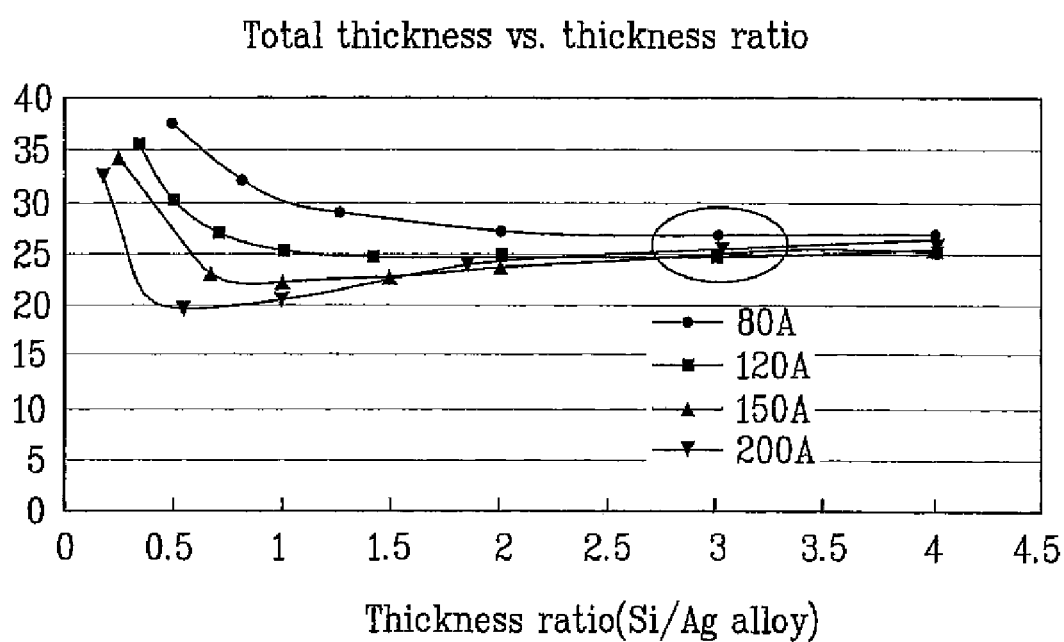
FIG. 8 is a view illustrating a ratio of thickness of the second information recording layer with respect to the thickness of the first information recording layer as a result of FIG. 7.

Referring to FIG. 7, the result of the simulation carried out with respect to the thicknesses of the respective information recording layers and the result of the combinations are as follows. FIG. 7 shows the reflectance of the optical recording medium according to the combination of thicknesses of the information recording layers obtained from a simulation. The first information recording layer of the optical recording medium according to the preferred embodiment of the present invention includes Si as the main element and the second information recording layer is an alloy having Ag as the main element. A horizontal axis in FIG. 7 represents the thickness of the first information recording layer having Si as the main element by a unit of Å, and the vertical axis represents the thickness of the second information recording layer made of the Ag-alloy by a unit of Å. Values represented in FIG. 7 indicate the reflectance with respect to the thicknesses of the respect information recording layers. From the result in FIG. 7, when the thickness of the first information recording layer having the main element Si is thicker than the thickness of the second information recording layer made of the Ag-alloy (a circle at the right lower side in FIG. 7), reflectance with respect to the laser power of 0.35 mW is not suddenly changed. When the result in FIG. 7 is represented as a graph of a relationship between the thickness and the reflectance, the result shown in FIG. 8 can be obtained. FIG. 8 shows a relationship between the reflectance and a ratio of thicknesses of the second information recording layer containing the Ag-alloy and the first information recording layer having the main element Si with respect to the above-mentioned laser power. In other words, if a thickness of whole information recording layers is 90 Å and the ratio of the thicknesses of the first information recording layer-the second information recording layer (Si—Ag alloy) is 2, the thickness of the Si information recording layer is 60 Å and the thickness of Ag information recording layer is 30 Å. According to the result in FIG. 8, as the ratio between the thicknesses of the first information recording layer-the second information recording layer (Si—Ag alloy) is increased, the optical contrast does not change but is stable at a constant value. Particularly, when the ratio between the thicknesses of the first information recording layer-the second information recording layer (Si—Ag alloy) is greater than 2 (when a value on the horizontal axis is greater than 2), the thickness of all information recording layers is equal to or greater than 90 Å, and even when the thickness of all information recording layers is less than 200 Å, the reflectance is stable (a circle in FIG. 8). Thus, preferably, the thickness of the information recording layers (the first and second information recording layers) of the optical recording medium according to the preferred embodiment of the present invention is equal to or greater than 90 Å and less than 200 Å, and the thickness ratio of the first information recording layer with respect to the second information recording layer is equal to or greater than 2. When the information recording layers of the optical recording medium are designed within the preferred ranges, the thickness of the information recording layer s can be compatibly designed.

Figure 9:
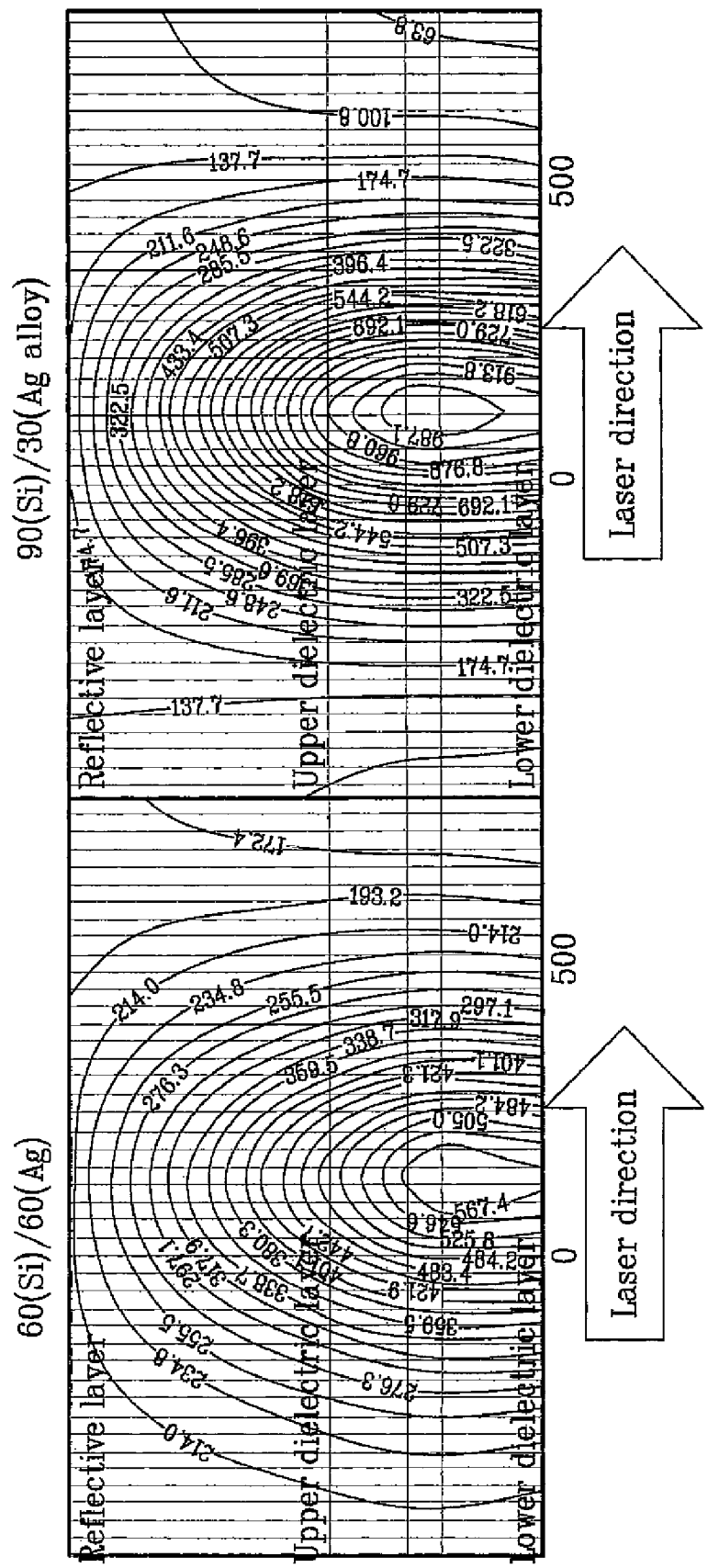
FIG. 9 is a view illustrating vertical temperature distribution with respect to the thickness combination of the information recording layers, occurring in the central region of tracks of the optical recording medium.

Referring to FIG. 9, the result of the simulation in which the recording sensitivity of the optical recording medium according to the preferred embodiment of the present invention can be confirmed will be described as follows. The left-side drawing in FIG. 9 represents temperature distribution in a vertical section of a central track of the optical recording medium when the laser beam is projected onto the optical recording medium in which the thickness ratio between the first information recording layer-the second information recording layer (Si—Ag alloy) is 1 (one) and the thickness of the respective information recording layers is 60 Å. The right-side drawing in FIG. 9 represents temperature distribution in a vertical section of a central track of the optical recording medium when the laser beam is projected onto the optical recording medium in which the thickness ratio between the first information recording layer-the second information recording layer (Si—Ag alloy) is 3, the thickness of the first information recording layer (Si) is 90 Å, and the thickness of the second information recording layer (Ag alloy) is 30 Å. From the comparison of the temperature distribution in the right-side drawing in FIG. 9 with the temperature distribution in the left-side drawing in FIG. 9, heat is concentrated in the temperature distribution of the right-side drawing more than the temperature distribution of the left-side drawing, and temperature is distributed in the direction more perpendicular to the direction of the laser beam. Since Ag contained in the second information recording layer has a high thermal diffusion rate, when the second information recording layer is thin or the thickness is less than the thickness of an information recording layer (the first information recording layer) having the main element Si, heat is not diffused in the track direction of the optical recording medium according to the preferred embodiment of the present invention and the temperature distribution becomes narrow in the optical recording medium. Moreover, since the thermal diffusion rate in the information recording layers, when the information recording layer containing Ag is thin, is slower than that when the information recording layer containing Ag is thick, temperature gradient between the material Si of the first information recording layer and the material Ag of the second information recording layer is weakly generated so that it is advantageous to react the two materials. Thus, when the ratio of the Si—Ag alloy used as the material of the respective information recording layers is increased, a uniform temperature gradient is formed in whole information recording layer and heat is concentrated so that the recording sensitivity of the optical recording medium is preferably increased.

Figure 10:
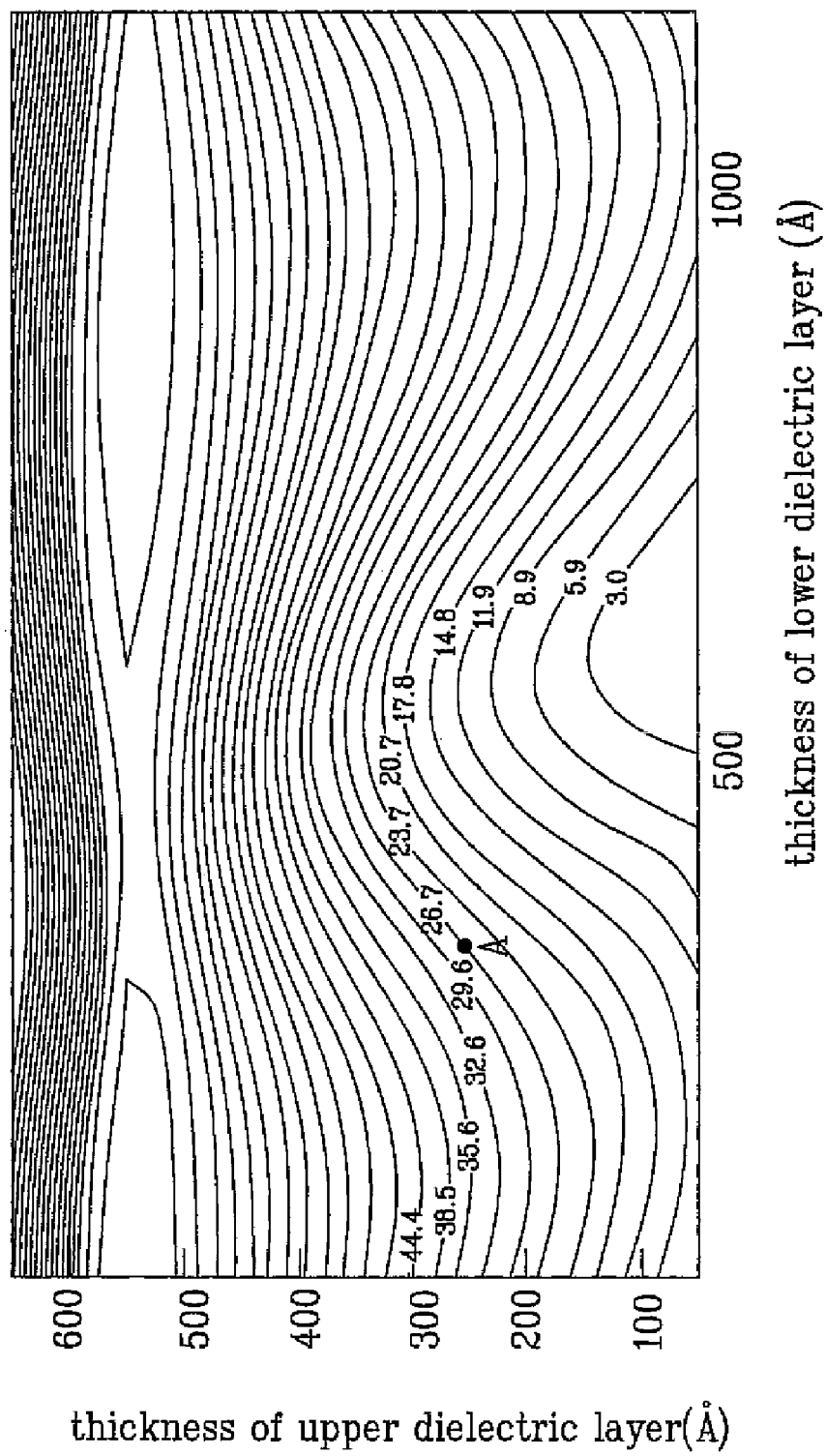
FIG. 10 is a view illustrating variations of reflectance of the optical recording medium, according to the preferred embodiment of the present invention, having information recording layers of Si (90 Å)/Ag alloy (30 Å) when the thickness combination between an upper dielectric layer and a lower dielectric layer is changed.

FIG. 10 shows results of a simulation for the optical contrast according to thicknesses of upper and lower dielectric layers when the combination of the first information recording layer and the second information recording layer of the optical recording medium according to the preferred embodiment of the present invention are Si (90 Å)/Ag alloy (30 Å). Since the optical contrast with respect to the thickness of the dielectric layers is periodical, the optical contrast of a dielectric layer having a thickness less than 90 nm is repeated in the dielectric layer having the thickness greater than 90 nm. Moreover, since an excessively thick dielectric layer may thermally affect the information recording layer, undesired results may occur. Thus, the thickness of the lower dielectric layer is preferably less than 90 nm. When the thickness of the upper dielectric layer in the vertical axis is greater than 50 nm, the contrast may be decreased. Further, when the upper dielectric layer is too thick, heat generated in the information recording layer is not smoothly discharged out so that it is difficult to adjust the shape of the recording mark and a length of the respective recording marks. Thus, the thickness of the upper dielectric layer is preferably less than 50 nm (500 Å).

A preferred embodiment of the present invention used to estimate the performance of the optical recording medium based on the simulation is as follows. The thickness combination of the respective layer of the optical recording medium is that the combination of the first information recording layer (Si, 90 Å)/the second information recording layer (Ag-alloy, 30 Å), and the thickness of the reflective layer is 700 Å. Moreover, the thickness of the lower dielectric layer is 325 Å and the thickness of the upper dielectric layer is 225 Å (the thicknesses of the upper and lower dielectric layers are represented by "A" point in FIG. 10).

Figure 11:
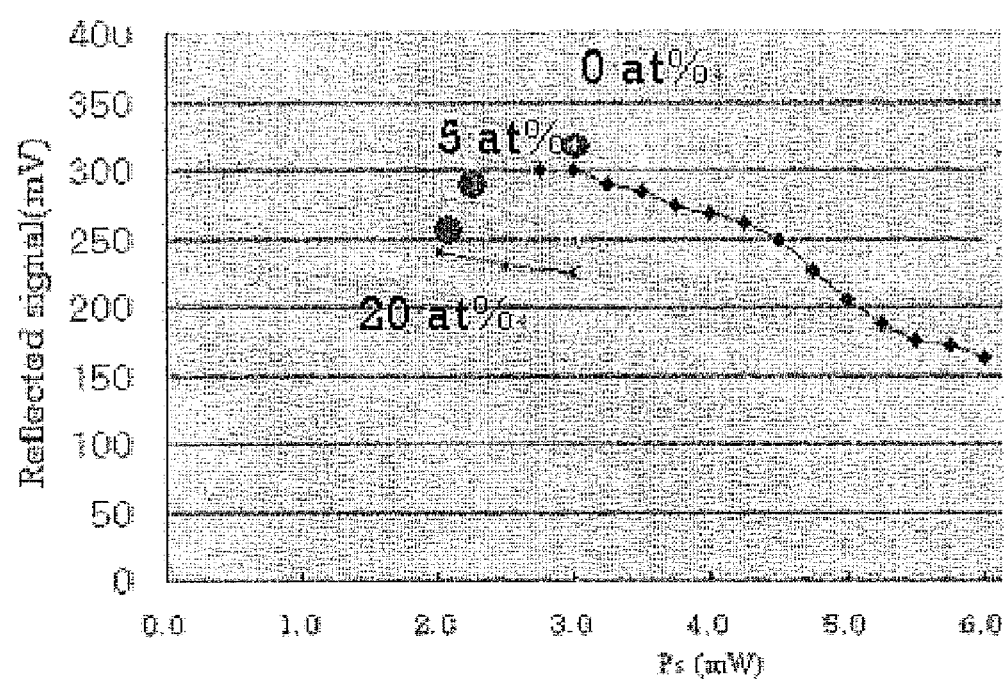
FIG. 11 is a view illustrating a result of measuring recording sensitivity with respect to DC annealing power according to addition ratio of Sb and Te when Sb and Te are added in the material Ag of the second information recording layer of the optical recording medium according to the preferred embodiment of the present invention.

FIG. 11 shows the result of estimating the actual recording sensitivity using the optical recording medium having the above-mentioned thicknesses. The sensitivity of the optical recording medium is estimated by measuring the DC annealing power by changing the ratio of other elements added into the second information recording layer having the main element Ag. Since Ag has a high thermal conductivity, it is preferred to add other elements to decrease the thermal conductivity of the second information recording layer. When other elements are added into the second information recording layer and the DC annealing power is reduced, the recording sensitivity of the information recording layer is increased.

In the experiment, as the added elements, Sb and Te are used, a ratio of the added elements is used to adjust the atomic percentage % by controlling a power of a sputter and co-sputtering. Referring to FIG. 11, the result of the experiments will be described as follows. In FIG. 11, Ag is contained only in the second information recording layer, that is, a upper line indicates a case of adding other elements of 0 atomic percentage %, a middle line indicates a case of adding Sb and Te of 5 atomic percentage % into Ag, and a lower line indicates a case of adding Sb and Te of 20 atomic percentage % into Ag. Respective lines in FIG. 11 indicate reflected signals of the optical recording medium when the laser beam is projected onto the optical medium according to the preferred embodiment of the present invention. The DC annealing power (minimum space power Ps) according to the ratio of the added elements is represented on the respective lines by big dots. As shown in FIG. 11, as the ratio of the added elements Sb and Te into Ag is increased, the minimum space power Ps is gradually decreased. In other words, as the ratio of other elements in the second information recording layer is increased, the recording sensitivity is increased.

Next, the jitter-estimation result of the optical recording medium having the above-described structure will be described with reference to FIG. 11. Firstly, as a condition for measuring jitter of the optical recording medium according to the preferred embodiment of the present invention, a channel bit clock is set to 66 MHz and the constant linear velocity of the optical recording medium is set to 5.28 m/s. Disc capacity of the optical recording medium is 23.3 Giga byte per information recording layer (single side) and TA520 (Yokogawa) is used as an apparatus for measuring the jitter. The number of samples for measuring the jitter is 30,000, the measuring position of the optical recording medium is a place located 30 mm from the inner circumference, and the land recording and the groove recording are carried out in the optical recording medium. Moreover, a 408 nm wavelength laser beam is used.

Figure 12:
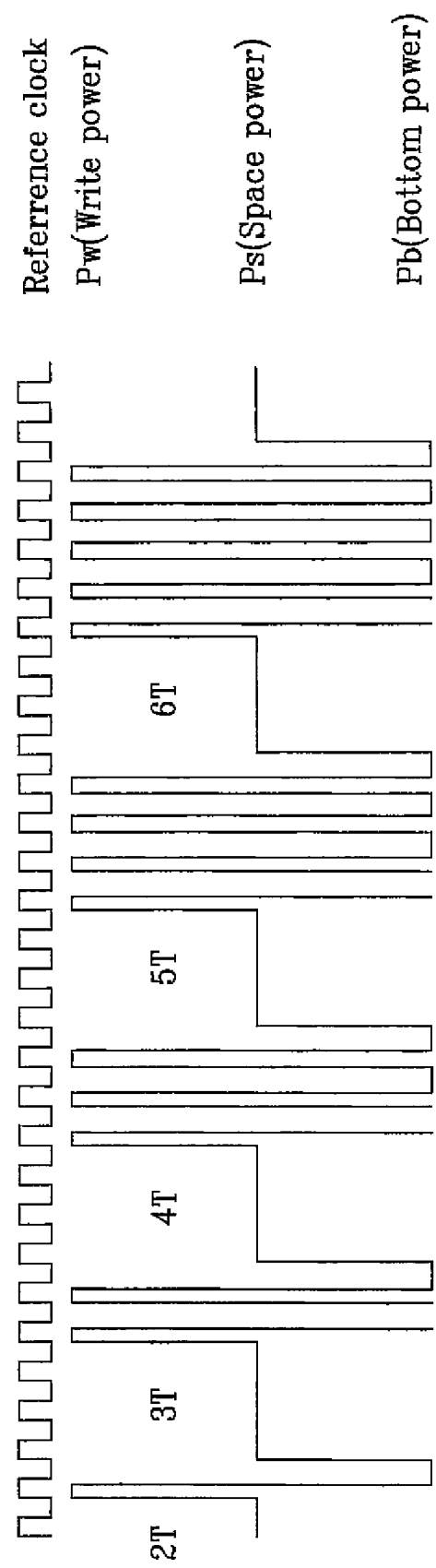
FIG. 12 is a view illustrating waveforms of recording pulse of a laser used in recording data in the optical recording medium according to the preferred embodiment of the present invention for the purpose of estimation of the performance of the optical recording medium of the present invention.
Figure 13:
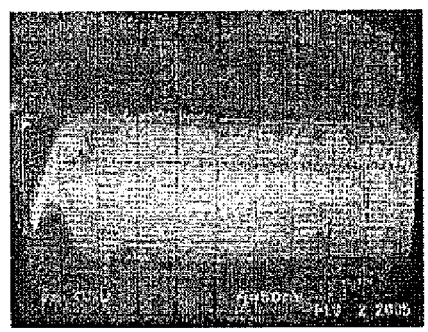
FIG. 13 is a view illustrating RF eye pattern of the optical recording medium according to the preferred embodiment of the present invention when Sb and Te are added into the material (Ag) of the second information recording layer at a 0 (zero) atomic %.
Figure 14:
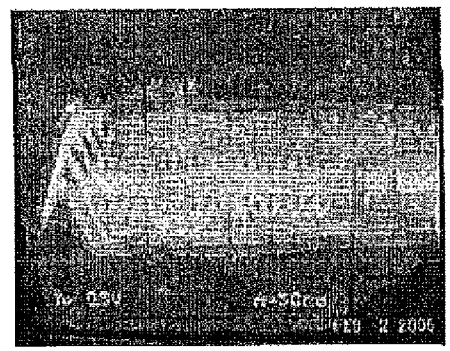
FIG. 14 is a view illustrating RF eye pattern of the optical recording medium according to the preferred embodiment of the present invention when Sb and Te are added into the material (Ag) of the second information recording layer at a 5 atomic %.
Figure 15:
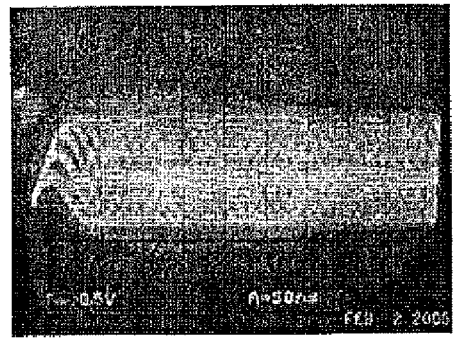
FIG. 15 is a view illustrating RF eye pattern of the optical recording medium according to the preferred embodiment of the present invention when Sb and Te are added into the material (Ag) of the second information recording layer at a 20 atomic %.
Figure 16:
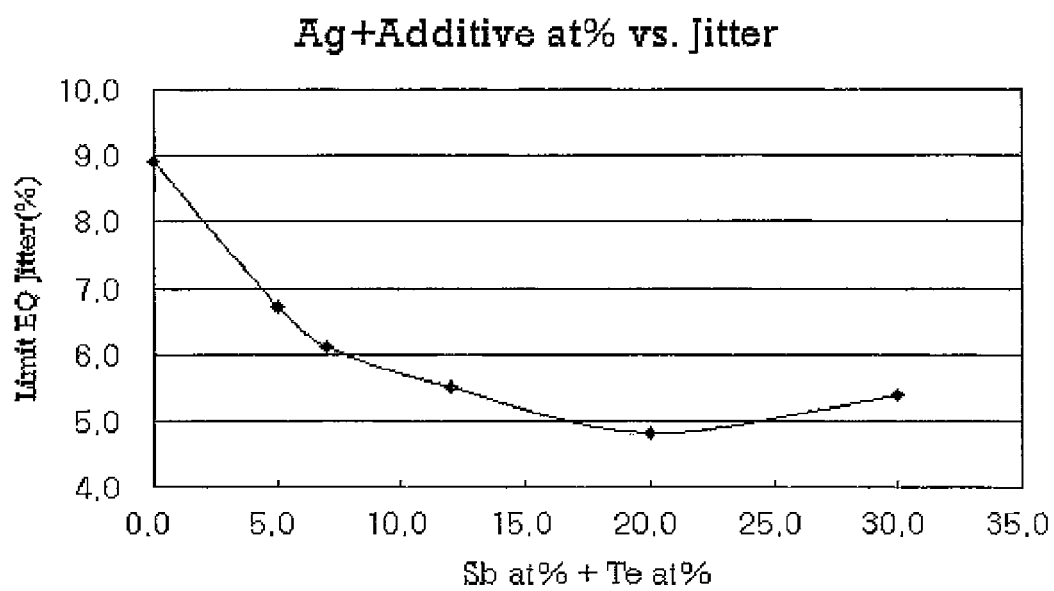
FIG. 16 is a view illustrating jitter with respect to addition ratio for an REF eye pattern of the optical recording medium according to the preferred embodiment of the present invention when Sb and Te are added into the material (Ag) of the second information recording layer of the optical recording medium according to the preferred embodiment of the present invention.

FIG. 12 shows waveforms of laser recording pulses used in data recording of the optical recording medium according to the preferred embodiment of the present invention. The laser pulses used in data recording of the optical recording medium have a recording power of 5.7 mW, a space power Ps of 1.5 mW, and a base power Pb of 0.1 mW. The laser recording pulses have random multiple pulses of 2T to 6T, and the modulation of the pulses for the data recording is carried out such that the respective recording pulses are divided into N−1 divisional pulses. Referring to FIGS. 13 to 15, eye patterns of the optical recording medium according to the added elements will be described as follows. FIGS. 13 to 15 show the eye patterns of a radio frequency with respect to the respective ratio of the added elements such as Sb and Te into Ag as materials of the second information recording layer. FIG. 13 shows the eye patterns when the ratio of added Sb and Te is 0%, FIG. 14 shows the eye patterns when the ratio of added Sb and Te is 5%, and FIG. 15 shows the eye patterns when the ratio of added Sb and Te is 20%. As the ratio of the added elements is increased, the eye pattern is more sharp and clear. The jitter appears because a changing point of the reproducing signal is not aligned with a changing point of the original signal on a time axis and the eye patterns become sharp as less signal interference occurs. Thus, as shown in FIGS. 13 to 15, as the ratio of the added elements Sb and Te into Ag of the second information recording layer is increased, the jitter characteristics of the optical recording medium are improved. Thus, the second information recording layer of the optical recording medium according to the preferred embodiment of the present invention preferably has a high ratio of Sb and Te. FIG. 16 is a graph illustrating the jitter with respect to the ratio of Sb and Te added into the second information recording layer of the optical recording medium. The jitter when Sb and Te are added into Ag of the second information recording layer is lower than that when none of the added elements are added into the second information recording layer (the ratio of the added element is 0%).

The advantages of the optical recording medium of the present invention are as follows.

Firstly, in the optical recording medium of the present invention, the recording mark is generated by the mechanism for generating a new material due to the reaction of materials in the information recording layer. According to the optical recording medium having the recording material of the present invention, an optical recording medium having a very high recording density and a very high data transfer rate satisfying a high density optical disc system can be provided using a blue laser.

Secondly, according to the optical recording medium having the recording material combination of the present invention, an optical recording medium having a high contrast between the recording mark and the space can be provided even when data is recorded with a high density and a high recording sensitivity.

Thirdly, according to the optical recording medium of the present invention having the combination of the recording materials, the optical recording medium has excellent mark stability and recording characteristics and it is not necessary to increase the laser power for generating the recording mark.

Although the optical recording medium of the present invention having excellent performance is described by a case of a single information recording layer, the excellent performance of the optical recording medium is exhibited in an optical recording medium having two or more information recording layers. In one or more of two or more information recording layers, the materials, the thickness ratio, and sum of the thicknesses may be combined, such that they are included within are the scope of the appended claims and their equivalents. Moreover, it will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An optical recording medium comprising:
a substrate;
a reflective layer positioned on the substrate to reflect an entering laser beam; and
at least one recording layer, the recording layer comprising:
a first information recording layer containing one or more elements selected from a group of Si, Ge, and Sb; and
a second information recording layer containing an Ag element and one or more elements selected from a group of Si, Sb, Te, Ge, and Al,
wherein a thickness of the recording layer is equal to or greater than 90 Å and less than 200 Å, and
a ratio of a thickness of the first information recording layer with respect to a thickness of the second information recording layer is equal to or greater than two.

2. The optical recording medium as set forth in claim 1, wherein the recording layer comprises one or more first information recording layers and one or more second information recording layers, and the first information recording layers and the second information recording layers are alternately laminated such that the number of contacting surfaces between the first information recording layers and the second information recording layers is equal to or greater than two.

3. The optical recording medium as set forth in claim 1, wherein the recording layer further comprises a recording sensitivity acceleration layer containing one or more elements selected from a group of Sn, Zn, Pb, Bi, Ti, Te, Se, S, Al, Ga, Ge, Cd, I, and In.

4. The optical recording medium as set forth in claim 3, wherein the recording sensitivity acceleration layer is laminated to contact any one of surfaces of the first information recording layer through which the laser beam firstly enters and the surface thereof near the substrate.

5. The optical recording medium as set forth in claim 3, wherein the recording sensitivity acceleration layer is laminated to contact any one of surfaces of the second information recording layer through which the laser beam firstly enters and the surface thereof near the substrate.

6. The optical recording medium as set forth in claim 1, further comprising a dielectric layer laminated to contact at least one of surfaces of the first information recording layer through which the laser beam firstly enters and the surface thereof near the substrate.

7. The optical recording medium as set forth in claim 6, wherein a thickness of the dielectric layer exceeds 0 nm and is less than 90 nm when the dielectric layer is laminated on a layer surface of the information recording layer through which the laser beam firstly enters.

8. The optical recording medium as set forth in claim 6, wherein a thickness of the dielectric layer exceeds 0 nm and is less than 50 nm when the dielectric layer is laminated on one of layer surfaces of the information recording layer near the substrate.

9. The optical recording medium as set forth in claim 1, wherein the first information recording layer includes one element of 50 or more atomic percentage selected from a group of Si, Ge, and Sb.

10. The optical recording medium as set forth in claim 1, wherein the optical recording medium comprises a recordable optical recording medium.

11. An optical recording medium comprising:
a substrate;
a reflective layer positioned on the substrate to reflect an entering laser beam;
two or more recording layers positioned on the reflective layer; and
a separation layer laminated between the respective recording layers adjacent to each other, wherein each of the respective information recording layers comprises:
a first information recording layer containing one or more elements selected from a group of Si, Ge, and Sb; and
a second information recording layer containing an Ag element and one or more elements selected from a group of Si, Sb, Te, and Al,
wherein a thickness of the respective recording layers is equal to or greater than 90 Å and less than 200 Å, and
a ratio of a thickness of the first information recording layer with respect to a thickness of the second information recording layer is equal to or greater than two.

12. The optical recording medium as set forth in claim 11, wherein a ratio between the thickness of the first information recording layer and the thickness of the second information recording layer, contained in one of the two or more recording layers, is different from a ratio between the thickness of the first information recording layer and the thickness of the second information recording layer, which are contained in another one of the two or more recording layers.

13. The optical recording medium as set forth in claim 11, wherein a sum of thicknesses of the first information recording layer and the second information recording layer, contained in one of the two or more recording layers, is different from a sum of thicknesses of the first information recording layer and the second information recording layer contained in another one of the two or more recording layer.

14. The optical recording medium as set forth in claim 11, wherein at least one of the two or more recording layers comprises one or more first information recording layers and one or more second information recording layers, and the first information recording layers and the second information recording layers are alternately laminated such that the number of contacting surfaces between the first information recording layers and the second information recording layers is equal to or greater than two.

15. The optical recording medium as set forth in claim 11, wherein at least one of the two or more recording layers further comprises a recording sensitivity acceleration layer containing one or more elements selected from a group of Sn, Zn, Pb, Bi, Ti, Te, Se, S, Al, Ga, Ge, Cd, I, and In.

16. The optical recording medium as set forth in claim 15, wherein the recording sensitivity acceleration layer is laminated to contact any one of surfaces of the first information recording layer through which the laser beam firstly enters and the surface thereof near the substrate.

17. The optical recording medium as set forth in claim 15, wherein the recording sensitivity acceleration layer is laminated to contact any one of surfaces of the second information recording layer through which the laser beam firstly enters and the surface thereof near the substrate.

18. The optical recording medium as set forth in claim 11, further comprising a dielectric layer laminated to contact at least one of surfaces of at least one of the two or more recording layers through which the laser beam firstly enters and the surface thereof near the substrate.

19. The optical recording medium as set forth in claim 18, wherein a thickness of the dielectric layer exceeds 0 nm and is less than 90 mm when the dielectric layer is laminated on a surface of the recording layer through which the laser beam firstly enters.

20. The optical recording medium as set forth in claim 18, wherein a thickness of the dielectric layer exceeds 0 nm and is less than 50 nm when the dielectric layer is laminated on a surface of recording layer, the surface being nearer the substrate than the other surface.

21. The optical recording medium as set forth in claim 11, wherein at least one of the first information recording layers includes one element of 50 or more atomic percentage selected from a group of Si, Ge, and Sb.

22. The optical recording medium as set forth in claim 11, wherein the optical recording medium comprises a recordable optical recording medium.

23. A method for forming an optical recording medium, the method comprising:
forming a substrate;
forming a reflective layer positioned on the substrate to reflect an entering laser beam;
forming two or more recording layers positioned on the reflective layer; and
forming a separation layer laminated between the respective recording layers adjacent to each other,
wherein each of the respective information recording layers comprises:
a first information recording layer containing one or more elements selected from a group of Si, Ge, and Sb; and
a second information recording layer containing an Ag element and one or more elements selected from a group of Si, Sb, Te, and Al,
wherein a thickness of the respective recording layers is equal to or greater than 90 Å and less than 200 Å, and
a ratio of a thickness of the first information recording layer with respect to a thickness of the second information recording layer is equal to or greater than two.

24. The method as set forth in claim 23, wherein the forming of the two or more recording layers comprises:
forming the two or more recording layers so that a ratio between the thickness of the first information recording layer and the thickness of the second information recording layer, contained in one of the two or more recording layers, is different from a ratio between the thickness of the first information recording layer and the thickness of the second information recording layer, which are contained in another one of the two or more recording layers.

* * * * *